United States Patent

Brönnimann et al.

[11] Patent Number: 5,109,251
[45] Date of Patent: Apr. 28, 1992

[54] PHOTOGRAPHIC COLOR COPYING APPARATUS

[75] Inventors: Rolf Brönnimann; Harald Maxeiner, both of Buchs, Switzerland

[73] Assignee: Gretag Systems, Inc., Bothell, Wash.

[21] Appl. No.: 622,593

[22] Filed: Dec. 5, 1990

[30] Foreign Application Priority Data

Dec. 13, 1989 [CH] Switzerland .............. 4478/89

[51] Int. Cl.⁵ .............................................. G03B 27/80
[52] U.S. Cl. ......................................... 355/38; 355/77
[58] Field of Search .................... 355/35, 38, 68, 77; 356/404, 444

[56] References Cited

U.S. PATENT DOCUMENTS

| | | | |
|---|---|---|---|
| 2,300,970 | 11/1942 | Riess et al. | 355/38 |
| 3,677,641 | 7/1972 | King et al. | 355/68 X |
| 3,944,362 | 3/1976 | Dailey | 355/38 |
| 4,061,428 | 12/1977 | Amano et al. | 356/203 X |
| 4,082,465 | 4/1978 | Bickl et al. | 356/203 |
| 4,188,125 | 2/1980 | Barbieri et al. | 355/38 X |
| 4,352,550 | 10/1982 | Uchida | 355/1 X |
| 4,472,046 | 9/1984 | Kohyama | 355/1 |
| 4,564,866 | 1/1986 | Comberg | 358/302 |
| 4,589,766 | 5/1986 | Fürsich et al. | 355/38 |
| 4,748,680 | 5/1988 | Margolin | 355/1 X |
| 4,760,421 | 7/1988 | Margolin | 355/1 |
| 4,762,985 | 8/1988 | Imai et al. | 355/444 X |
| 4,779,987 | 10/1988 | Umemoto et al. | 355/38 X |
| 4,827,526 | 5/1989 | Matsumoto | 355/77 X |
| 4,873,546 | 10/1989 | Zahn et al. | 355/38 |
| 4,933,710 | 6/1990 | Beaulieu et al. | 355/38 |
| 4,951,084 | 8/1990 | von Stein et al. | 355/38 |
| 4,975,728 | 12/1990 | Gordon | 355/1 |
| 4,975,729 | 12/1990 | Gordon | 355/1 |

FOREIGN PATENT DOCUMENTS

| | | |
|---|---|---|
| 312499 | 4/1989 | European Pat. Off. . |
| 2459456 | 12/1974 | Fed. Rep. of Germany . |
| 3737775 | 5/1989 | Fed. Rep. of Germany . |
| 2621710 | 4/1989 | France . |
| 637223 | 7/1983 | Switzerland . |

OTHER PUBLICATIONS

European Search Report No. RS85566.
European Search Report No. RS84940CH.
European Search Report No. RS84953CH.

Primary Examiner—L. T. Hix
Assistant Examiner—D. Rutledge
Attorney, Agent, or Firm—Burns, Doane, Swecker & Mathis

[57] ABSTRACT

The copy master is illuminated in scanning sections located along scanning lines and measuring light coming from the scanning sections of a scanning line is spectrally decomposed and subsequently passed onto a photoreceiver line coordinated with the scanning line involved. Along this photoreceiver line photoreceiver groups sequentially follow each other, each group being assigned to the spectrum of a scanning section of the scanning line involved.

11 Claims, 4 Drawing Sheets

PHOTOGRAPHIC COLOR COPYING APPARATUS

BACKGROUND OF THE INVENTION

The invention concerns a photographic copying apparatus having a projection means to image a copy master onto a photosensitive copy material, a photoelectric measuring layout to measure the copy master in a plurality of scanning sections in scanning lines extending over the copy master, and exposure controls combined with the measuring layout and the projection means to determine the quantities of copy light exposing the copy material.

A color copying apparatus of this type is known for example from EP-A-O 312 499. In the case of the color copying apparatus described therein the color extract values essentially controlling the exposure are obtained in a manner such that a line of the copy master comprising numerous individual (imaginary) scanning areas is always exposed and that the light coming from every scanning area of the copy master is resolved by a prism into narrow spectral sections. This light divided into spectral sections impacts a two-dimensional field of photoelectrical transducers arranged in columns and lines. The columns extend parallel to the scanning line on the copy master and the lines are perpendicular to it. A line of the transducer field is correlated with each of the scanning sections of the scanning line on the copy master being exposed and every individual photoreceiver of such a line is correlated with a spectral section of the measuring light from the associated scanning section. The individual lines of the two-dimensional transducer field are located adjacent to each other, in a manner identical with the layout of the associated scanning sections of the illuminated line on the master. The scanning of the individual scanning lines of the copy master takes place sequentially by the stepping advance of the copy master chosen in keeping with the resolution desired.

The simultaneous scanning of a complete scanning line of the master therefore requires a two-dimensional field of photoreceivers: one dimension for the spatial resolution of the line into its individual scanning sections, and the other for the spectral resolution into individual spectral sections. The simultaneous scanning of the entire copy master, i.e. all of the scanning lines, simultaneously is not possible with such a scanning apparatus, as for this another "dimension" of photoreceivers would be required. Consequently, with the copy apparatus of EP-A-O 312 499 the scanning of the individual lines of the copy master must be carried out sequentially, as mentioned above.

SUMMARY OF THE INVENTION

The invention is intended to eliminate the aforedescribed difficulty and to provide conditions for the simultaneous spectral scanning of the entire copy master.

In a copy apparatus according to the invention only one "one-dimensional" field or line of photoreceivers is required for the spatially and spectrally resolved scanning of a complete scanning line. The spatial and spectral resolution is thus placed into a single dimension. The second dimension is therefore available for the scanning lines. Further, the adjacent layout of several such photoreceiver rows the simultaneous scanning of all of the scanning lines is possible.

The reduction of the dimensions of the photoreceiver layout according to the invention has a further important advantage arising from the nature of charge-coupled imagers (CCD) customarily used for such purposes. According to experience, one-dimensional fields (rows) of such transducers have significantly better properties than two-dimensional fields. In particular, the signal-to-noise ratio is appreciably more favorable. This in turn improves the result of subsequent electronic computer evaluation operations (usually a weighted summation of signals). In addition, the electric connection of the individual transducers of such a row is substantially less complicated.

BRIEF DESCRIPTION OF THE DRAWINGS

The invention will become more apparent from the following detailed description of the preferred embodiments with reference to the drawings, wherein like elements have been designated by like numerals and wherein.

DETAILED DESCRIPTION OF THE PREFERRED EMBODIMENTS

Figure 1:
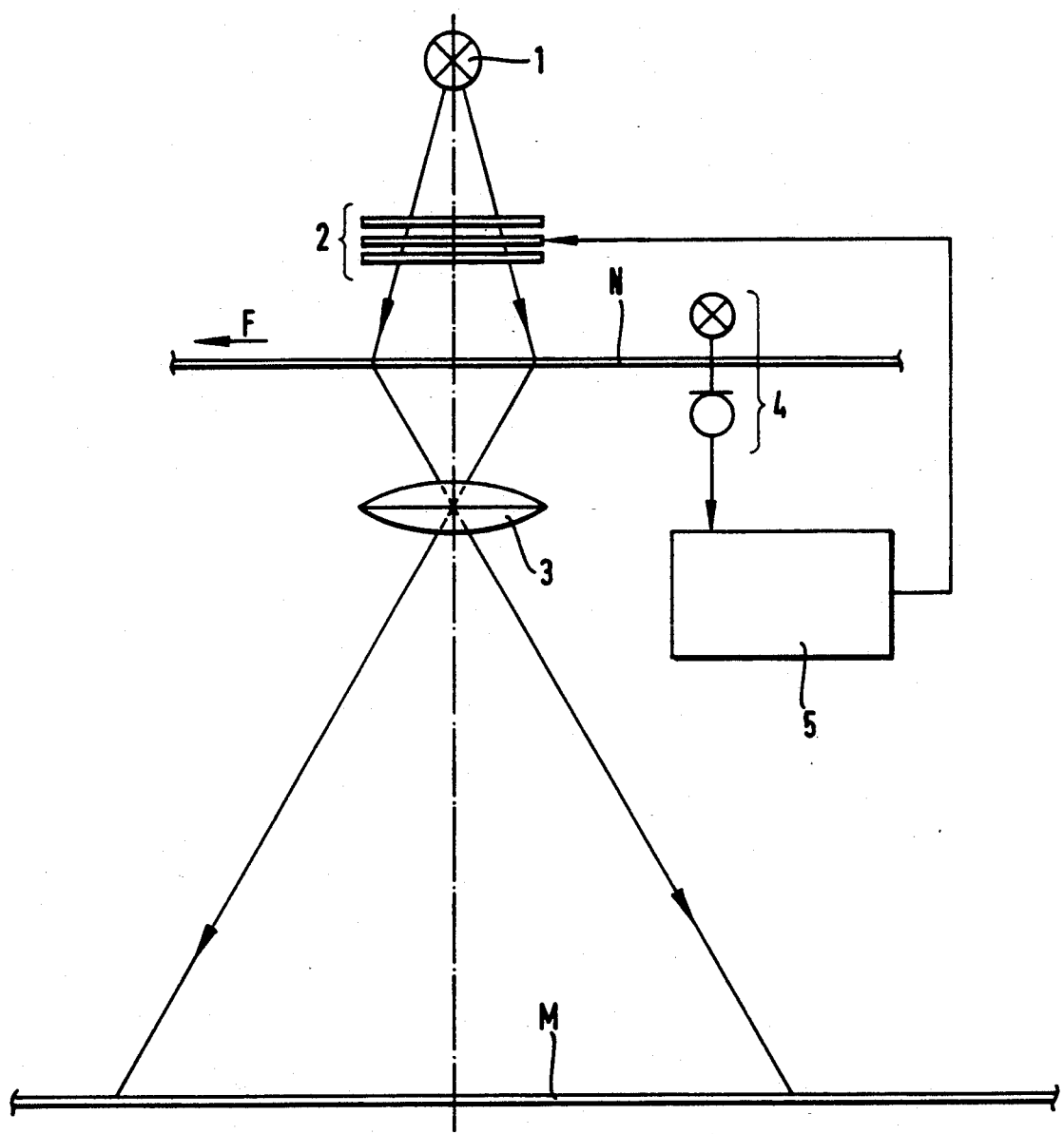
FIG. 1 shows a schematic overall view of a color copying apparatus according to the invention.

FIG. 1 shows the most essential components necessary for an understanding of the invention. It includes a copying light source 1, a set of servocontrolled color shutters 2, imaging optics 3, a photoelectric measuring layout 4 symbolically represented by a source of measuring light and a photoreceiver, and electronic exposure control 5. The copy master N exposed to the light coming from the copying light source 1 is reproduced by the optics 3 on the photosensitive copy material M, wherein the quantities of copying light for the individual partial exposures are determined by the copy controls 5 on the basis of a preceding sectional photoelectric measurement and measured value analysis of the copy master, and controlled by means of the color shutters. To this extent the copy apparatus corresponds to the devices described in EP-A-O 312 499 or DE-OS 37 37 775 and requires no further explanation.

Figure 2:
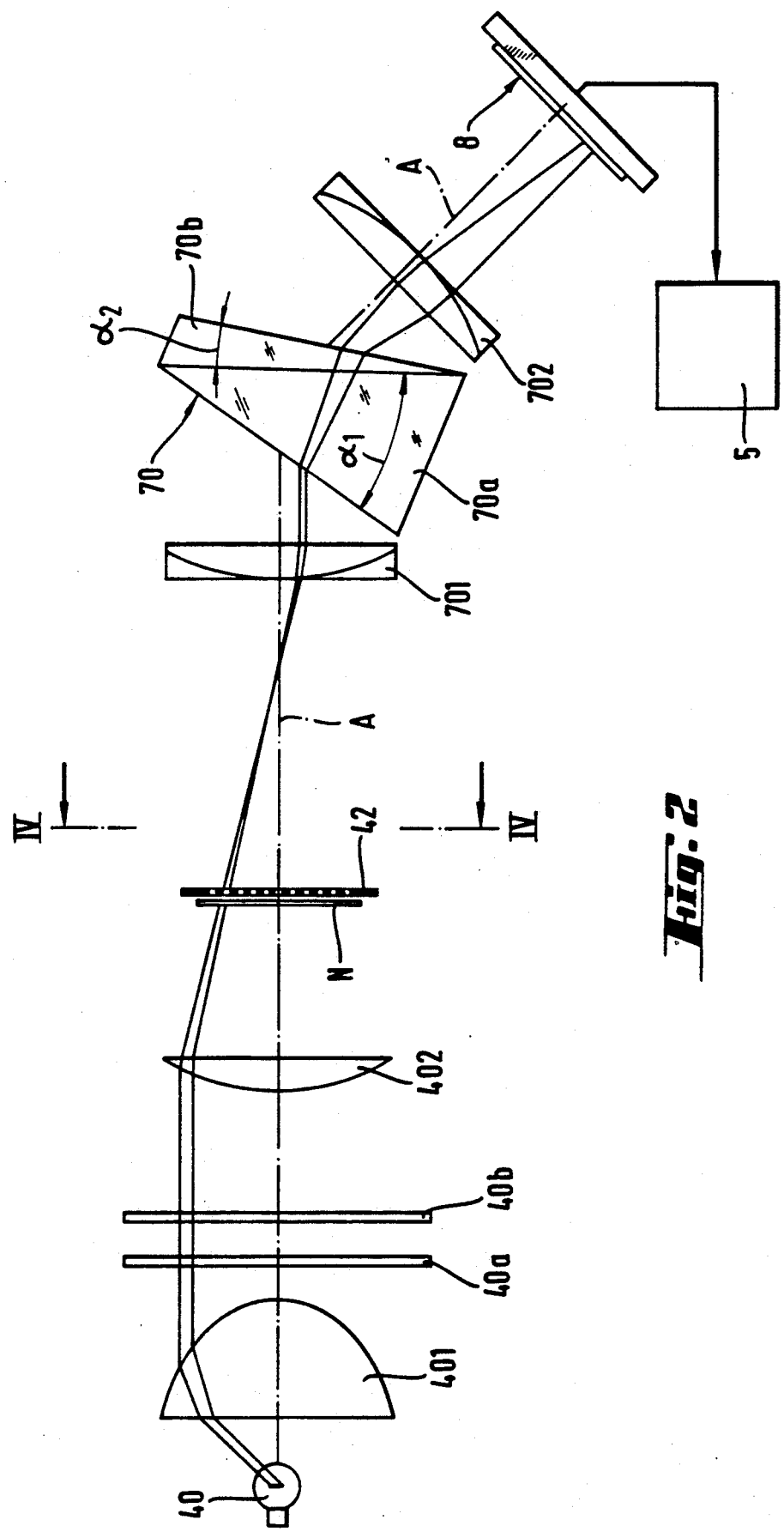
FIG. 2 shows a schematic axial section through the complete measuring layout of the color copying apparatus of FIG. 1.

FIG. 2 shows the photoelectric measuring layout of the color copying apparatus in an axial section, schematically. It comprises a source of measuring light 40, four lenses 401, 402, 701, 702, two adapting filters 40a and 40b, a slit mask 42, an optical prism 70 consisting of two parts 70a and 70b, together with a photoreceiver layout 8, connected with the exposure controls 5. The exposure layout consisting of the measuring light source 40, the two lenses 401 and 402 and the adapting filters 40a and 40b is conventional in its configuration and exposes the copy master N to a parallel light. The adapting filters 40a and 40b serve to reduce spectral components whose presence in the light of the measuring light source are proportionally too strong. The light passing through the copy master N impacts the slit mask 42, which permits the passage of light through its slits only, thereby dividing the copy master N into numerous individual scanning sections, as it were, and finally arrives through the lens 701, the prism 70 and the lens 702 on the photoreceiver layout 8.

Figure 3:
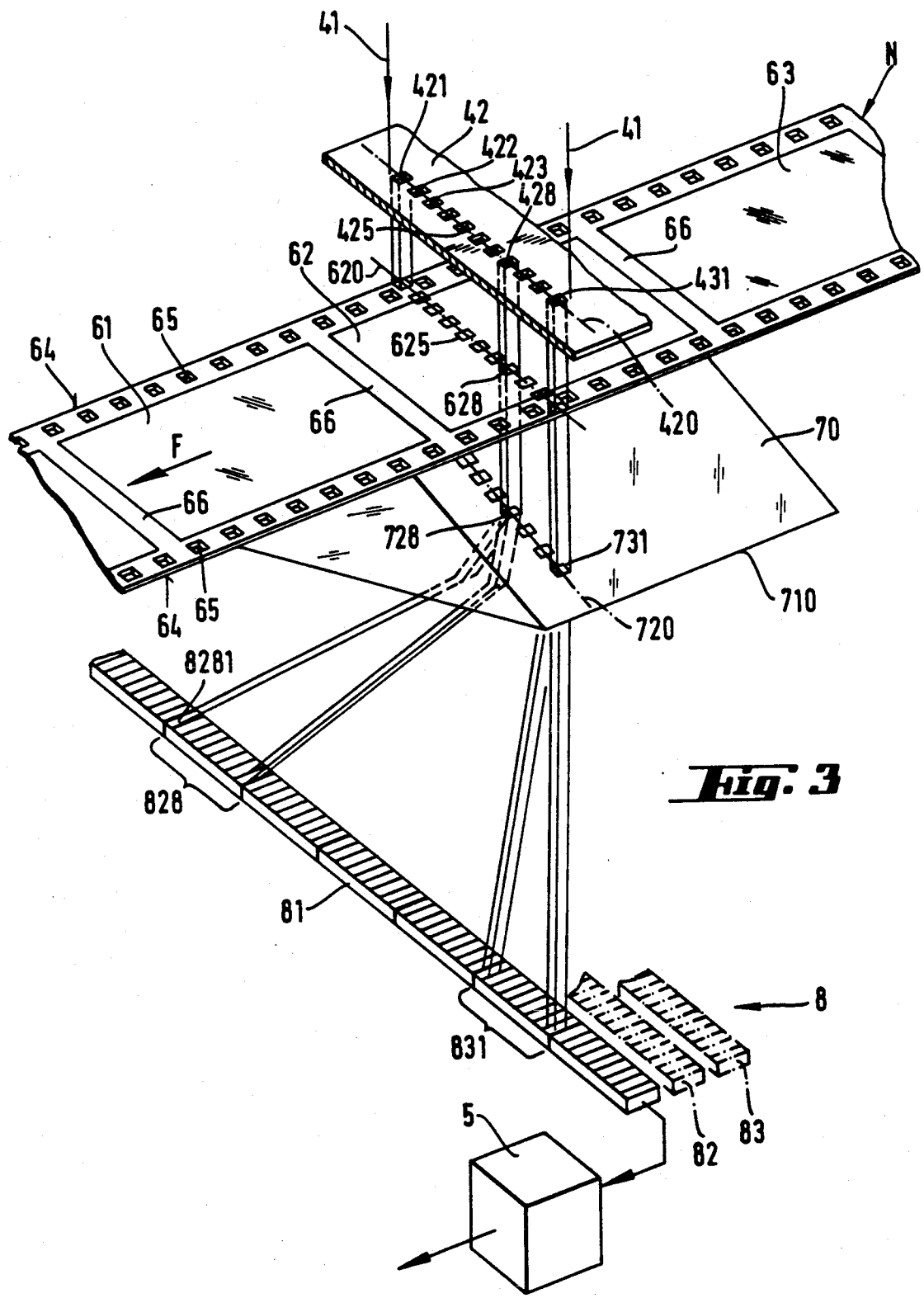
FIG. 3 shows a schematic view of parts of the measuring layout of the color copying apparatus of FIG. 1 to demonstrate the fundamental operating principle of the measuring layout.

The operating principle of the measuring layout 4 will become more apparent from FIG. 3, which shows a part of the measuring layout 4 schematically. For reasons of clarity, both the exposure layout and the two lenses 701 and 702 were eliminated. The slit mask 42 in actual practice is also located in the beam path behind the copy master N. However, since this has no effect on the principal function of the measuring layout, the slit mask 42 is shown here for better visibility in the beam path in front of the copy master N.

The measuring light emitted by the measuring light source 40, indicated symbolically by the broken lines 41, impacts the slit mask 42, which is transparent for the measuring light 41 only in the area of the slits 421, 422, 423, etc. to 431. The slits 421, 422, 423, etc. are located on the mask 42 along a line indicated by the broken line 420, which extends perpendicular to the direction of advance F of the copy master N. The copy master N in the form of a negative film strip with edge perforation 65 for transportation, is therefore illuminated in individual small scanning sections, of which for the sake of clarity only a few, 625 to 628, are shown. These scanning sections are produced on the copy master N as the result of the layout of the light transparent slits 421 to 431 of the mask 42 along a line (scanning line) indicated by the broken line 620, again perpendicular to the direction of advance F of the copy master N.

The resolution of the measuring layout 4 perpendicular to the direction of advance F of the copy master N thus depends on the number and the dimensions of the slits located along the line 420 on the mask 42. Resolutions of about 20–40 scanning sections per scanning line of a negative (24×36 mm) are usual, so that the slit mask has a corresponding number of slits. The resolution in the direction of advance F is the result of the spacing of two successive scanning lines and thus of the advance path and the advance velocity of the copy master N and the period of time between the scanning of two successive lines. A resolution in the advance direction F of about 30–50 lines per negative is customary, so that a negative (24×36 mm) is on the average divided into approximately 1000 individual scanning sections.

The light originating in scanning sections is made parallel in the lens 701 shown only in FIG. 2 and impacts the prism 70 (scanning line 720). The prism 70 is located in the beam path in a manner such that its refractive edge 710 (FIG. 3) extends optically perpendicular to the scanning line 620 and such that it is exposed to the light of all of the scanning sections of the scanning line 620. The prism splits the light coming from the scanning sections into its spectral components, which are passed by the lens 702 shown only in FIG. 2 onto the photoreceiver line 81. In the photoreceiver line 81, a separate photoreceiver group is assigned to every spectrum of a scanning section, with the photoreceiver groups following each other along the photoreceiver line 81. For example, the light coming from the scanning section 628 impacts the prism in the area 728. The spectral components of the light arriving at the prism in the area 728 are passed by the lens 702 onto the photoreceiver group 828 in the photoreceiver line 81. Each individual photoreceiver 8281 of the photoreceiver group 828 is impacted by a narrow spectral section. The electrical output signals of the individual photoreceivers are forwarded then to the exposure controls 5 (FIG. 1), the operating principle of which are known, for example, from EP-A-O 3123 499. Analogically, the light coming from the other scanning sections of the copy master N impacts the other photoreceiver groups of the photoreceiver line 81 (e.g. the light coming from section 731 on the prism 70 impacts photoreceiver group 831 of the photoreceiver line 81). The individual photoreceiver groups are aligned in the photoreceiver line in the same order as the associated scanning sections of the copy master.

Figure 4:
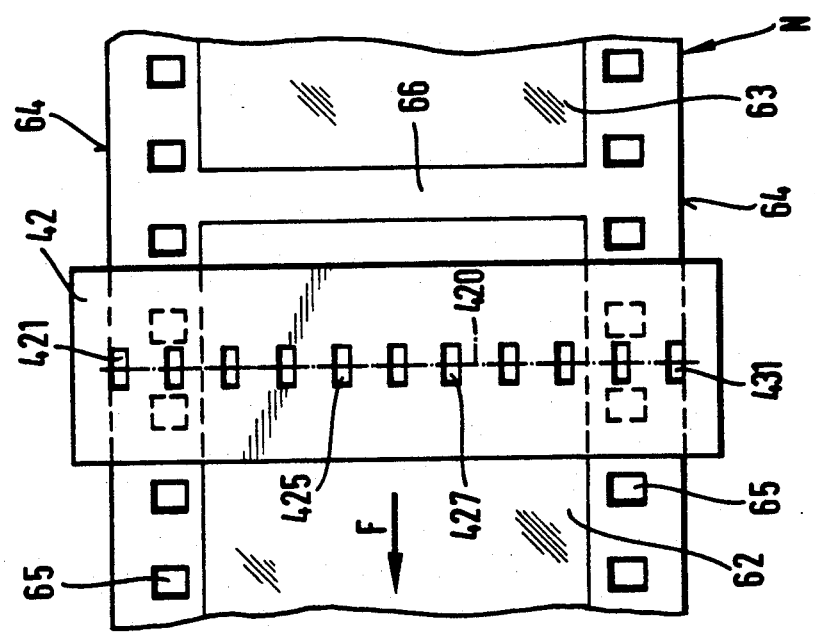

FIG. 4 shows a slit mask 42 and its positioning relative to the copy master N (viewed in the opposite direction of the beam path). The light penetrating through the copy master is able to pass through the slits 421–431 only. The copy master is thereby figuratively divided into a number of individual scanning sections along the scanning line 620 (FIG. 3) which corresponds to the number of slits 421 to 431. The scanning sections produced along such a scanning line 620 are therefore illuminated simultaneously. The entire copy master is scanned sequentially line by line. In contrast to the copying apparatus described in EP-A-O 312 499, only a one-dimensional photoreceiver line is required for the measurement of the scanning sections of a scanning line, instead of a two-dimensional photoreceiver field. Such one-dimensional photoreceiver lines are characterized, as mentioned above, by a better signal-to-noise ratio, compared to two-dimensional photoreceiver fields.

Figure 5:
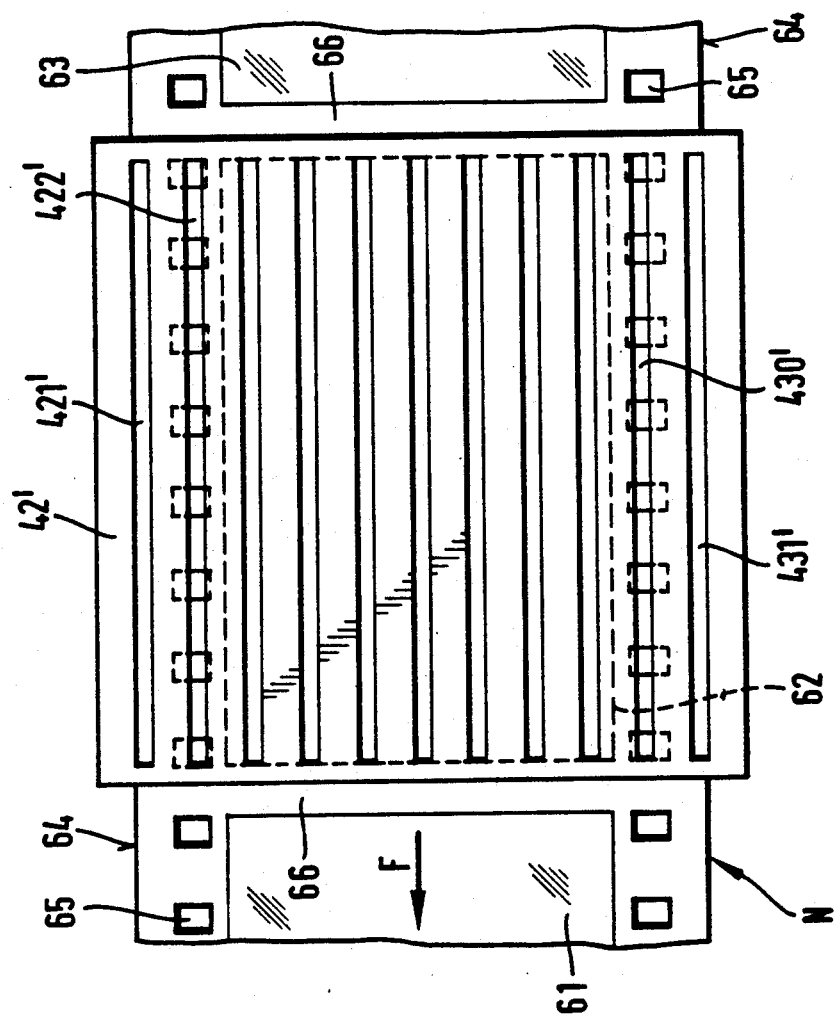
FIGS. 4-5 show a view in the direction of the arrows IV—IV of FIG. 2 of the slit mask over a section of a strip of negative film.

An alternate exemplary embodiment of the measuring layout is shown in FIG. 5. The slits 421'–431' of the slit mask 42' extend perpendicular to the scanning lines, i.e., in the direction of transport F of the film N, over the entire image field 62 of the film N. The prism 70 (FIGS. 2 and 3) is dimensioned so that it splits all of the light passing through the film N and subsequently through the slits 421'–431' of the slit mask 42' spectrally. Similarly, the lenses 701 and 702 are large enough so that they render all of the light passing through the film N and the slit mask 42' parallel and direct it onto the photoreceivers.

In the receiver layout 8 (FIG. 3) a corresponding photoreceiver line 81, 82, 83, etc. is provided for each of the scanning lines (i.e., each row of scanning sections). The resolution perpendicular to the direction of advance F is effected here again by the number and width of the individual slits 421'–431', but in the direction of advance F it is effected by the spacing of the individual photoreceiver lines. In FIG. 3, physically separated photoreceiver lines 81, 82, 83 are shown. The photoreceiver lines 81, 82 and 83 indicate symbolically that for every scanning line on the copy master N a row of photoreceivers is provided separately. The output signals of the individual photoreceivers are then conducted in a manner similar to that of FIG. 3 to the exposure controls 5, which are known from EP-A-O 312 499. Following the measurement of an entire image field the film is advanced to the next image field 63. A copying apparatus equipped with such a measuring layout has two essential advantages relative to that described in EP-A-O 312 499: firsty, the individual one-dimensional photoreceiver lines have a better signal-to-noise ratio, as already mentioned, relative to two-dimensional photoreceiver fields, and secondly, the entire copy master N may be measured simultaneously. Further, for the simultaneous scanning of the entire copy master N, merely one two-dimensional photoreceiver field consisting of individual photoreceiver lines, is required, while in the copy apparatus described in EP-A-O 312 499 such a two-dimensional field is required for measuring a single line of the copy master at a time.

In actual practice, the mask 42 or 42' may for example consist of a transparent disk, onto which the mask itself is vapor deposited. The optically transparent sections of the mask may extend past the lateral edge 64 (FIG. 3, FIG. 4 and FIG. 5) of the copy master N. In this manner characteristics specific to a given master, such as for example the DX coding of a film, may also be recognized. The webs 66 between the individual fields (for example FIG. 3, the web 66 between the image fields 61 and 62) may thus also be scanned and the measured results evaluated by known processes. The combination of the prism 70 formed of two (or more) parts 70a and 70b is also advantageous, as it permits the wavelength spacing of the spectral sections detected by the individual photoreceiver from each other to be approximately equal, such that the color resolution is also relatively constant (FIG. 2.). Particularly suitable for such a combination of the prism 70 from two parts 70a and 70b are the glasses BK 7 (refractive index: $n_1 = 1.65$) for the part 70a and SF 2 (refractive index: $n_2 = 1.52$) for the part 70b. The prism angle of the first prism part 70a is chosen from a range of about $\alpha_1 = 30° - 35°$, and in particular is selected as $\alpha_1 = 33.6°$, while the prism angle of the second prism part 70b is about $\alpha_2 = 10°$, and in particular is selected to be $\alpha_2 = 10.03°$.

Alternate configurations of the copying apparatus are also possible. Thus, for example, the mask 42 may be located in the vicinity of the measuring light source 40 in the beam path, or the mask may be applied directly to the source of measuring light. The prism 70 may consist of more than two parts. For example, a "direct vision prism may be obtained, i.e., a prism which splits the incoming light spectrally as before with an approximately constant color resolution, but leaves the beam axis A (FIG. 2), in contrast to the view in FIG. 2, unchanged. The entire copy master may again be scanned line by line, even if the entire copy master is exposed, by reading out the photoreceiver lines, line by line in succession. Obviously, the individual one-dimensional photoreceiver rows may be physically combined into a two-dimensional photoreceiver field, or the receiver layout may be designed as such a two-dimensional photoreceiver field. Even then, the copying apparatus still has the advantage that the spectra of the scanning sections of a scanning line of the copy master are measured by only one photoreceiver line of the photoreceiver field. Accordingly, as compared to the apparatus known for example from EP-A-O 312 499, in which for the measurement of the scanning sections of a scanning line of the copy master a two-dimensional photoreceiver field is required, a spatial dimension is saved, as it were.

It will be appreciated by those skilled in the art that the present invention can be embodied in other specific forms without departing from the spirit or essential characteristics thereof. The presently disclosed embodiments are therefore considered in all respect to be illustrative and not restrictive. The scope of the invention is indicated by the appended claims rather than the foregoing description, and all changes that come within the meaning and range of equivalents thereof are intended to be embraced therein.

What is claimed is:

1. Apparatus for photographic copying comprising;
   a projection means for imaging a copy master onto a photosensitive copy material;
   a photoelectric measuring layout for measuring the copy master in a plurality of scanning sections within scanning lines which extend over the copy master; exposure controls connected with the measuring layout and the projection means for determining quantities of copy light for exposing the copy material said measuring layout further including:
   a source of light to illuminate the copy master;
   a photoreceiver layout to detect measuring light originating in individual scanning sections of the copy master, said photoreceiver layout including a plurality of photo receivers arranged along a line in groups wherein individual groups of photoreceivers are located successively in the photoreceiver line;
   means for optically dispersing the measuring light originating in the scanning sections of the copy master into a plurality of narrow spectral sections; and,
   means for optically imaging said measuring light onto the photoreceiver layout such that measuring light originating in each of the individual scanning sections located in a scanning line impacts a separate group of associated photoreceivers and the individual spectral sections of the measuring light originating in a scanning section are incident on separate photoreceivers within the group of photoreceivers associated with the particular scanning section.

2. Copying apparatus according to claim 1, wherein the means for optically dispersing decompose the measuring light originating in the scanning sections optically parallel to the scanning lines and the line of photoreceivers extends optically parallel to the scanning lines.

3. Copying apparatus according to claim 2, wherein at least one additional line of photoreceivers is provided which is exposed to the measuring light originating in the scanning sections of another scanning line in a manner similar to that of said plurality of photoreceivers.

4. Copying apparatus according to claim 3, wherein a photoreceiver line is provided for each of the scanning lines of the copy master.

5. Copying apparatus according to claim 4, wherein the photoreceiver lines are combined in a photoreceiver field or formed by such a field.

6. Copying apparatus according to claim 2, wherein the photoreceivers are charge coupled photoelectric transducers.

7. Copying apparatus according to claim 2, wherein the means for optically dispersing further includes at least one optical prism, having a refracting edge which is located perpendicular to the scanning lines and which is simultaneously exposed relative to the measuring light originating in all of the scanning sections of a scanning line.

8. Copying apparatus according to claim 7, wherein a mask layout is provided in an immediate vicinity of the copy master, said mask determining the individual scanning sections of the copy master within one scanning line.

9. Copying apparatus according to claim 8, wherein the mask layout is a slit mask with a number of slits corresponding to the number of scanning sections within one scanning line.

10. Copying apparatus according to claim 9, wherein the slit mask extends over the entire copy master and includes slits which extend essentially perpendicular to the scanning lines.

11. Copying apparatus according to claim 7, wherein the at least one optical prism further includes two partial prisms with one of said partial prisms having a prism angle of about 30°–35° and a refractive index of about 1.52, and the other of said partial prisms having a prism angle of about 10° and a refractive index of about 1.65.

* * * * *